(12) United States Patent
Liang et al.

(10) Patent No.: US 6,785,000 B2
(45) Date of Patent: Aug. 31, 2004

(54) BULK OPTICAL INTERFEROMETER

(75) Inventors: Feng Liang, Shanghai (CN); Heping Zheng, Shanghai (CN); Li Wu, Fuxing Investment District (CN); Jiwu Ling, Fuxing Investment District (CN)

(73) Assignee: JDS Uniphase Corporation, San Jose, CA (US)

( * ) Notice: Subject to any disclaimer, the term of this patent is extended or adjusted under 35 U.S.C. 154(b) by 66 days.

(21) Appl. No.: 10/177,668

(22) Filed: Jun. 24, 2002

(65) Prior Publication Data

US 2003/0234935 A1 Dec. 25, 2003

(51) Int. Cl.[7] ............................. G01B 7/02; G02B 27/10
(52) U.S. Cl. ...................................... 356/450; 359/618
(58) Field of Search ................................ 359/450, 618, 359/480, 519

(56) References Cited

U.S. PATENT DOCUMENTS

| | | |
|---|---|---|
| 5,596,661 A | 1/1997 | Henry et al. |
| 6,169,604 B1 | 1/2001 | Cao |
| 6,243,200 B1 | 6/2001 | Zhou et al. |
| 6,252,716 B1 | 6/2001 | Paiam |
| 6,301,046 B1 | 10/2001 | Tai et al. |
| 6,304,689 B1 | 10/2001 | Dingel et al. |
| 2002/0171908 A1 * | 11/2002 | Copner et al. .............. 359/278 |

OTHER PUBLICATIONS

US patent application 10/058,534 to Copner et al.*

* cited by examiner

Primary Examiner—Frank G. Font
Assistant Examiner—Patrick Connolly
(74) Attorney, Agent, or Firm—Allen, Dyer, Doppelt Milbrath & Gilchrist, P.A.

(57) ABSTRACT

The present invention relates to an optical interferometer based on a Mach-Zehnder interferometer that can be used as an optical channel interleaver in wavelength division multiplexed (WDM) and dense wavelength division multiplexed (DWDM) optical networks. Optical channel interleavers/de-interleavers combine sets of WDM and DWDM channels for transmission over a network and/or separate WDM and DWDM signals into sets of channels with more convenient channel spacing for further de-multiplexing. The interferometer according to the present invention utilizes a ring resonator in each arm thereof as a phase shifter to provide a flat-top wavelength response with wide pass-bands and stop-bands.

15 Claims, 5 Drawing Sheets

BULK OPTICAL INTERFEROMETER

CROSS-REFERENCE TO RELATED APPLICATIONS

This is the first application filed for the present invention.

TECHNICAL FIELD

The present application relates to an optical interferometer, and in particular to a bulk optical interferometer based on a Mach-Zehnder interferometer (MZI) for use as a wavelength channel interleaver/de-interleaver.

BACKGROUND OF THE INVENTION

Optical interleavers are becoming a popular tool in dense wavelength division multiplexed (DWDM) communications networks as an interface between components designed for signals with a first wavelength channel spacing and components designed for signals with a second wavelength channel spacing. In the past 200 GHz channel spacing was the norm, but as the demand for increased bandwidth grew, 100 GHz channel spacing became the standard. In the next generation of communications networks 50 GHz channels spacing and even 25 GHz channel spacing will become common place. However, conventional de-multiplexing filters, e.g. dichroic filters, do not have the capability to separate channels that are so closely spaced without complex and expensive modifications, and without resulting in significant channel crosstalk. Accordingly, optical interleavers are used to separate the closely spaced channels into two sets of channels, which are twice as far apart. This process can continue until the channels are far enough apart for conventional multiplexing to be effective.

Interleavers have taken several different forms including: Birefringent Crystal Interleavers (BCI) such as the one disclosed in U.S. Pat. No. 6,301,046 issued Oct. 9, 2001 in the name of Kuochou Tai et al; Integrated Lattice Filter Interleavers such as the one disclosed in U.S. Pat. No. 5,596,661 issued Jan. 21, 1997 in the name of Charles Henry; and Michelson Gires-Tournois Interleavers (MGTI) such as the ones disclosed in U.S. Pat. No. 6,304,689 issued Oct. 16, 2001 in the name of Benjamin Dingel et al., U.S. Pat. No. 6,252,716 issued Jun. 26, 2001 in the name of Reza Paiam, and U.S. Pat. No. 6,169,828 issued Jan. 2, 2001 in the name of Simon Cao. A polarization based interleaver using a split-mirror ring resonator is disclosed in U.S. Pat. No. 6,243,200 issued Jun. 5, 2001 in the name of Gan Zhou et al.

An object of the present invention is to overcome the shortcomings of the prior art and provide a simple bulk optical interleaver with very few parts that is easily manufactured at low cost and provides reliable and stable performance.

SUMMARY OF THE INVENTION

Accordingly, the present invention relates to an optical interferometer device comprising:

a first input port for launching an input optical beam;

a first beam-splitter for separating the input optical beam into first and second sub-beams traveling along first and second paths, respectively;

a first ring resonator positioned in the first path including at least two substantially fully reflective surfaces and a first partially reflective surface, the first partially reflective surface for passing a portion of the first sub-beam into the first ring resonator, while reflecting the remainder of the first sub-beam away therefrom, whereby light exiting the first ring resonator is combined with the remainder of the first sub-beam forming a first recombined sub-beam;

a second ring resonator positioned in the second path including at least two substantially fully reflective surfaces and a second partially reflective surface, the second partially reflective surface for passing a portion of the second sub-beam into the second ring resonator, while reflecting the remainder of the second sub-beam away therefrom, whereby light exiting the second ring resonator is combined with the remainder of the second sub-beam forming a second recombined sub-beam;

a second beam splitter for receiving the first and second recombined sub-beams resulting in the interference thereof and the production of a first output beam and a second output beam;

a first output port for outputting the first output beam; and a second output port for outputting the second output beam.

Another aspect of the present invention relates to a Mach-Zehnder interferometer comprising:

a beam splitter for separating an input beam of light into a first sub-beam and a second sub-beam, and for directing the first and second sub-beams along first and second arms, respectively, of the interferometer;

a first ring resonator in the first arm of the interferometer having a first resonator delay for effecting the phase response of the first sub-beam;

a second ring resonator in the second arm of the interferometer having a second resonator delay for effecting the phase response of the second sub-beam;

a beam combiner/splitter for interfering the first and second sub-beams resulting in first and second output beams.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
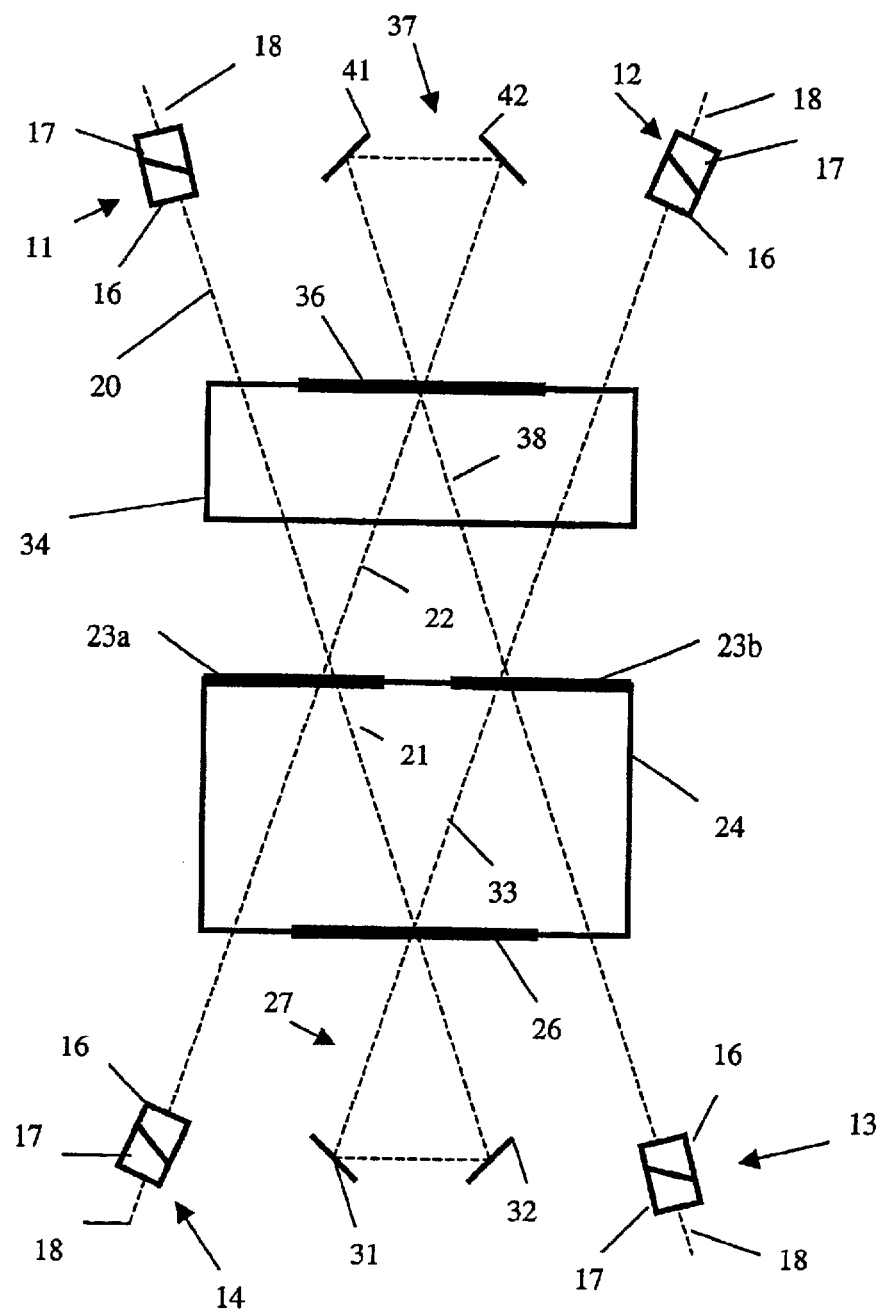
FIG. 1 is a schematic representation of one embodiment of an interferometer according to the present invention.

The interferometer, generally indicated at 10, according to the present invention is based on a Mach Zehnder interferometer (MZI) into and out of which light can be launched via one or more of four ports 11, 12, 13 and 14. Each port includes a collimating/focusing lens 16 optically coupled to a ferrule 17 encasing an end of an optical fiber waveguide 18 For the sake of convenience and simplicity in our discussion, it will be assumed that the light will be launched into the interferometer 10 via a first port 11 and output via second and third ports 12 and 13, respectively. However, as would be obvious to one skilled in the art, various other combinations are possible, including: input the second and/or third ports 12 and 13, respectively and output the first and/or fourth ports 11 and 14, respectively.

The input light beam 20, typically a dense wavelength division multiplexed (DWDM) signal including a plurality of wavelength channels, is launched via the first port 11 and gets split into a first sub-beam 21 and a second sub-beam 22 by a beam-splitter in the form of a first beam splitting coating 23a on a portion of one side of a first glass (or other transparent) substrate 24. Preferably, the first beam splitting coating 23a splits the input light beam 20 is half, i.e. the reflectance ranges between 42% and 50%, and ideally 50%. The first sub-beam 21 passes through the first substrate 24 until intersecting a first partially-reflective surface 26 applied to an opposite side of the first substrate 24. The reflectance of the first partially-reflective surface 26 is preferably between 42% and 50%. A portion of the first sub-beam 21 passes into a first ring resonator 27, which includes a first mirror 31 and a second mirror 32. Light exiting from the first ring resonator 27 after traveling a first resonator delay distance is combined with light reflected by the first partially reflective coating 26 forming a recombined first sub-beam 33. The recombined sub-beam 33 is directed back through the first substrate 24.

The second sub-beam 22 is reflected by the first beam splitting coating 23a through a second glass (or other transparent) substrate 34 for intersection with a second partially-reflective surface 36 applied thereto. The reflectance of the second partially-reflective surface 36 is preferably between 2.4% and 5.2%. A portion of the second sub-beam 22 passes into a second ring resonator 37, which includes a first mirror 41 and a second mirror 42. Light leaving the second ring resonator 37 after traveling a second ring delay distance is combined with light reflected by the second partially reflective surface 36, and directed towards the first substrate 24 forming a second recombined sub-beam 38. The second recombined sub-beam 38 interferes with the first recombined sub-beam 33 at a second beam splitting coating 23b resulting in a portion of the light, i.e. a first output beam, being output the second port 12 and the remainder of the light, i.e. a second output beam, being output the third port 13. Preferably, the reflectance of the second beam splitting coating 23b also ranges from 43% to 50%, and is ideally 50%. To facilitate manufacture, the first and second beam splitting coatings 23a and 23b could have the same reflectance, e.g. 50%, and be applied simultaneously.

The optical path from the first beam splitting coating 23a to the first partially-reflective surface 26 back to the second beam splitting coating 22b is defined as a first optical path of the Mach-Zehnder interferometer. The optical path from the first beam splitting coating 23a to the second partially-reflective surface 26 back to the second beam splitting coating 22b is defined as a second optical path of the Mach-Zehnder interferometer. To create interference the first optical path has a different length than the second optical path. This difference is call an optical path length difference. During use as an interleaver, it is preferable that the optical path with the partially reflective surface having the lower reflectivity (e.g. the second optical path) is shorter than the other, and that the optical path length difference between the first and second optical paths is one half of the first resonator delay distance, assuming that the first and second resonator delay distances are equal. In use as an interleaver, one set of wavelength channels, e.g. the even ITU channels, is output the second port 12, while another set of wavelength channels, e.g. the odd ITU channels, is output the third port 13.

Figure 2:
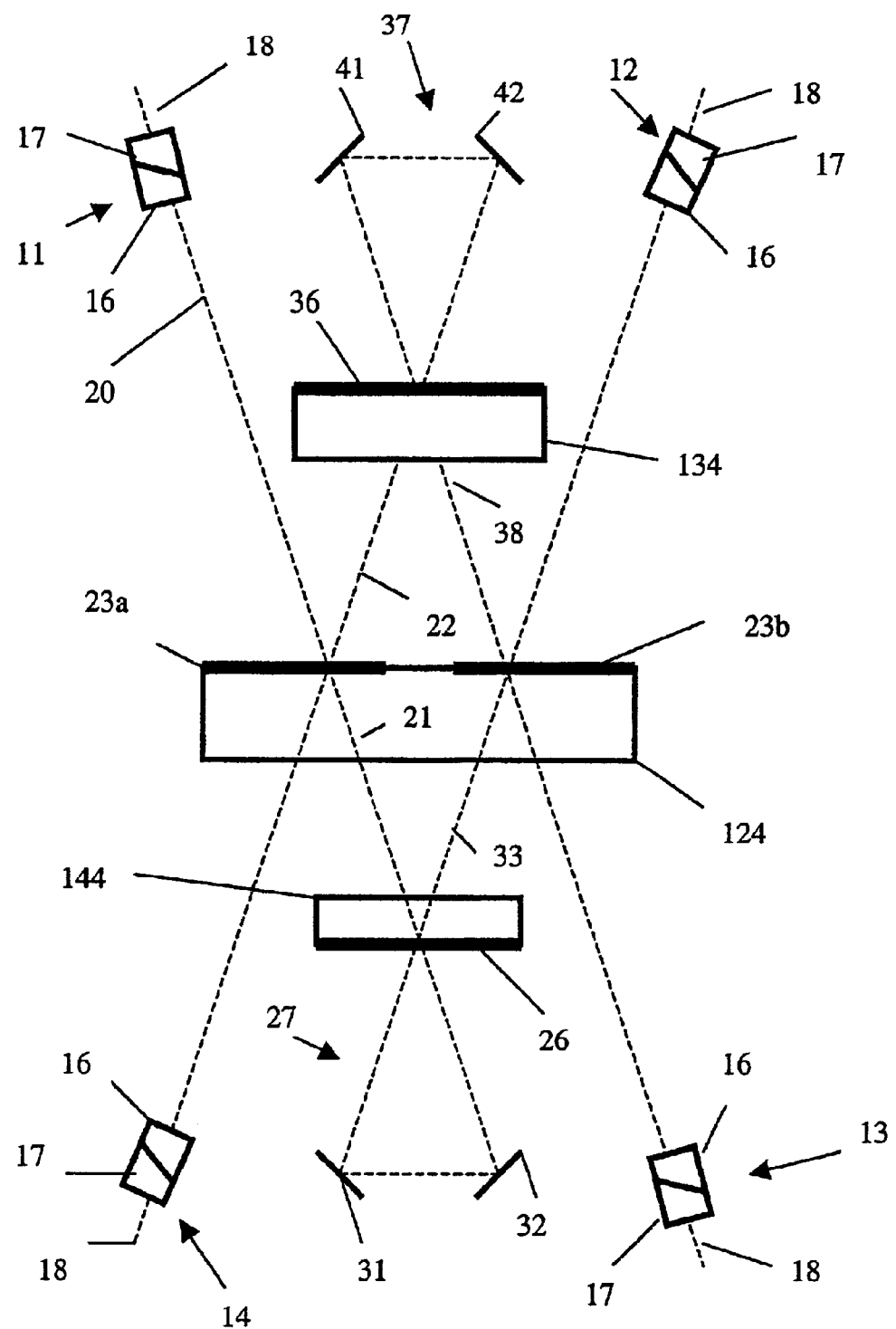
FIG. 2 is a schematic representation of another embodiment of an interferometer according to the present invention.

FIG. 2 illustrates an alternative embodiment of the present invention in which a minimum amount of substrate material is used. New first and second substrates 124 and 134, respectively, are substantially thinner than there counterparts 24 and 34 from FIG. 1. As a consequence, a third substrate 144 is required for supporting the first partially reflective coating 26. The substrate 124 can also be divided into two separate substrates, each one having one of the beam splitting coatings 23a and 23b.

Figure 3A:
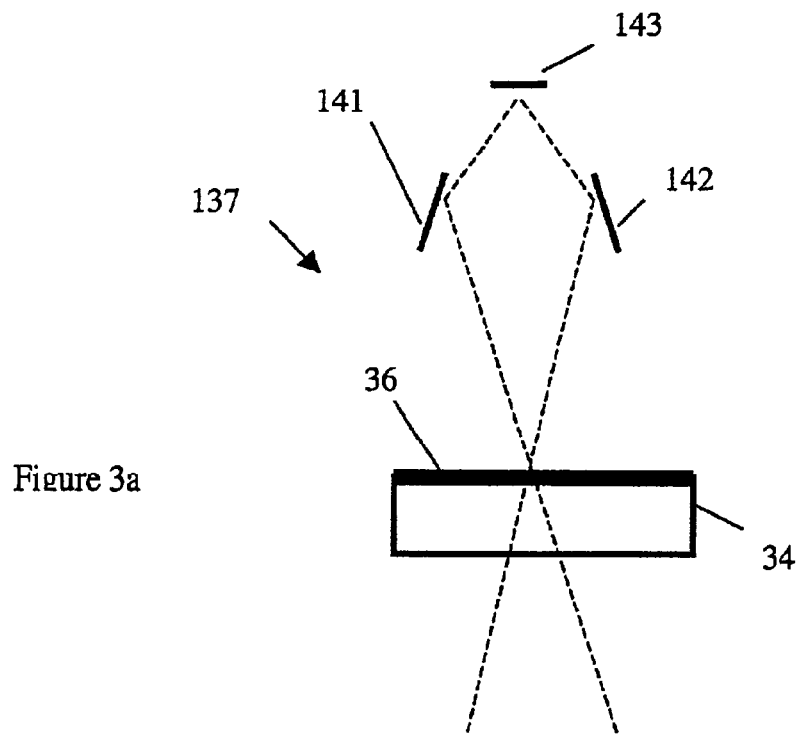
FIGS. 3a and 3b illustrate alternative examples of ring resonators useable in the embodiments of FIGS. 1 and 2.
Figure 3B:
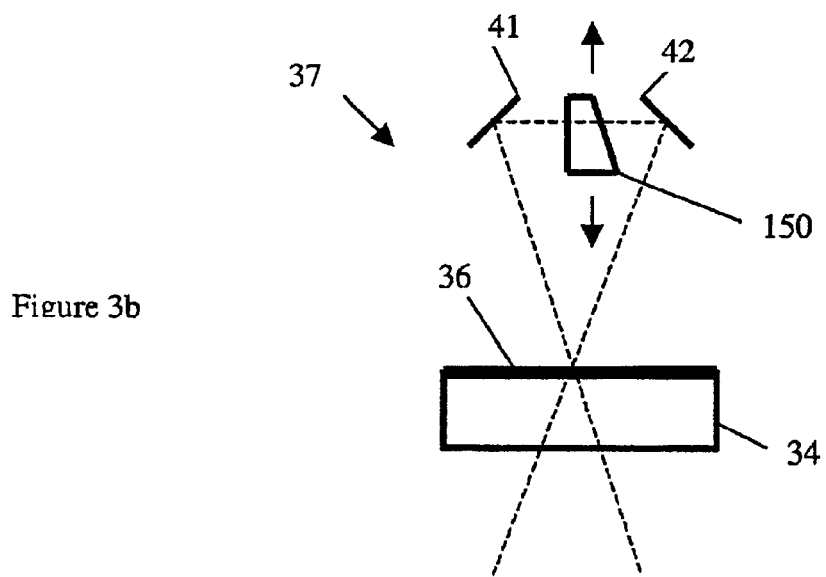

FIGS. 3a and 3b illustrate two other examples of ring resonators for use in place of the first and second ring resonators 27 and 37. Ring resonator 137 (FIG. 3a) includes the second substrate 34 and the second partially reflective coating 36, along with three reflective surfaces 141, 142 and 143. As is obvious to one skilled in the art, any number of reflective surfaces could be used. FIG. 3b illustrates the second ring resonator 37 with the addition of a wedge-shaped tuning plate 150. The tuning plate 150, which has an index of refraction different than air, can be used to make small adjustments to the optical path length of one of the ring resonators to match the two ring resonators appropriately. Lateral adjustment of the wedge-shaped tuning plate 150 will result in the beam of light traveling through more or less thereof, which increases or decreases the optical path length of the ring resonator.

Figure 4:
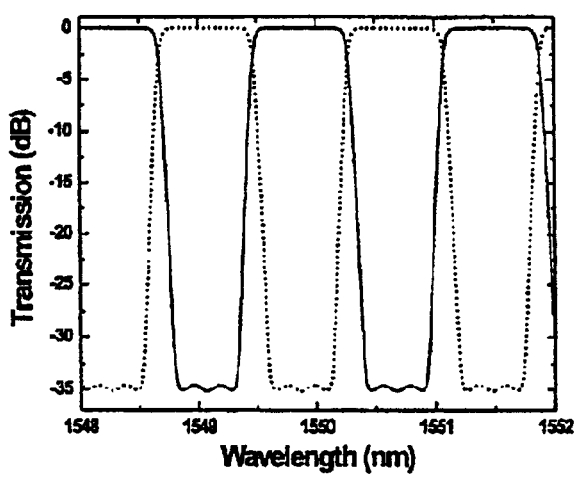
FIG. 4 illustrates a transmission spectrum showing both sets of channels from an optical interleaver in accordance with one embodiment of the present invention.
Figure 5:
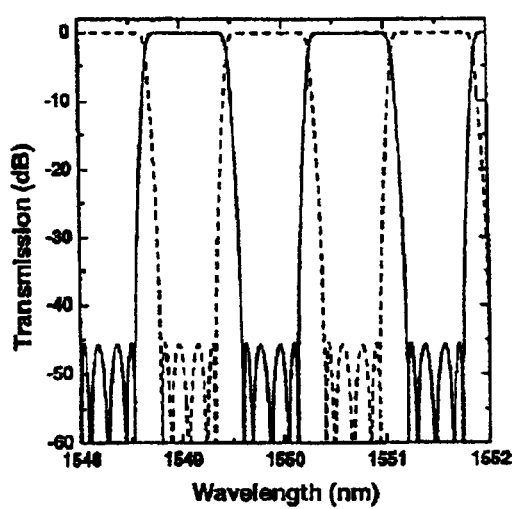
FIG. 5 illustrates a transmission spectrum showing both sets of channels from an optical interleaver in accordance with another embodiment of the present invention.

FIGS. 4 and 5 illustrate theoretical transmission spectral responses for interleavers according to the present invention. The solid line represents the even ITU wavelength channels, while the dotted line represents the odd ITU wavelength channels. The bandwidth of the pass-band at −0.5 dB is over 85% of the free spectral range (FSR) of the interleaver, and the bandwidth of the stop-band at −25 dB is over 75% of the FSR of the interleaver. The differences between the two response curves is due to the reflectivity of the first and second partially reflective surfaces 26 and 36. To obtain the plot in FIG. 4, the reflectance of the first and second beam splitting coatings 23a and 23b are 50% and 48.3, respectively, and the reflectance of the first and second partially-reflective coatings 26 and 36 are 44.8% and 3.4%, respectively. To obtain the plot in FIG. 5, the reflectance of the first and second beam splitting coatings 23a and 23b are both 50%, and the reflectance of the first and second paitially-reflective coatings 26 and 36 are 42.2% and 3.3%, respectively.

Figure 6:
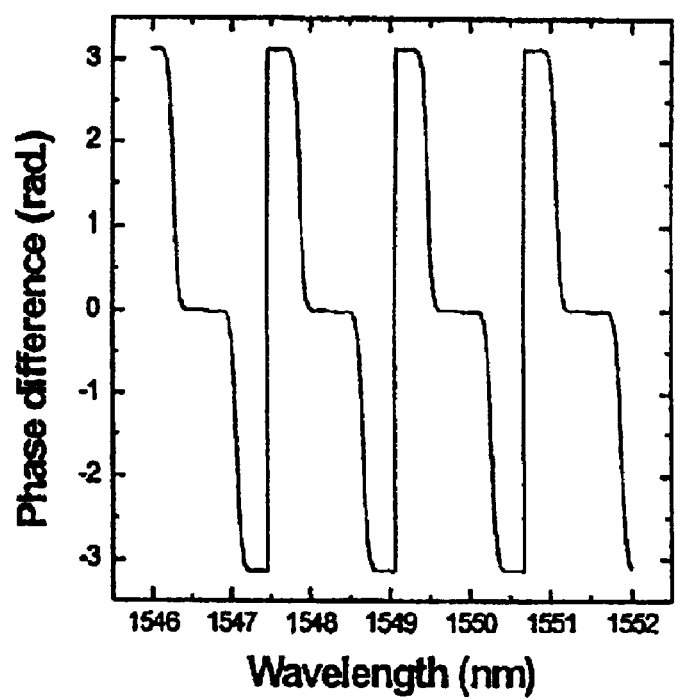
FIG. 6 is a plot of Phase Difference vs Wavelength for one set of the channels from an optical interleaver in accordance with the one embodiment of the present invention.

The plot illustrated in FIG. 6 shows the phase difference of the odd ITU wavelength channels for an interleaver according to the present invention. The phase difference alternates between 0 and ±π over consecutive wavelength channels equivalent to the FSR of the optical interleaver. The horizontal segments of the plot with 0 phase difference represent sections of constructive interference, i.e. flattop passbands, while the horizontal segments of the plot with ±π phase differences represent sections of destructive interference, i.e. stop-bands.

The device according to the present invention can also be used to de-interleave two sets of complementary wavelength channels. Two input beams, each one comprising one of the complimentary sets of wavelength channels, are input the second and third ports 12 and 13, respectively (or the first and fourth ports 11 and 14), and directed at the beam splitter where they are interfered and separated into two sub-beams. Each of the sub-beams travels to a different one of the ring resonators 27 or 37 forming two recombined sub-beams, which are then combined at the beam splitter, and output the first or fourth port, 11 or 14 (or the second or third port, 12 or 13).

We claim:

1. An optical interferometer device comprising:
   a first input port for launching an input optical beam;
   a first beam-splitter for separating the input optical beam into first and second sub-beams traveling along first and second paths, respectively;
   a first ring resonator positioned in the first path including at least two substantially fully reflective surfaces and a first partially reflective surface, the first partially reflective surface for passing a portion of the first sub-beam into the first ring resonator, while reflecting the remainder of the first sub-beam away therefrom, whereby light exiting the first ring resonator after a first resonator delay is combined with the remainder of the first sub-beam forming a first recombined sub-beam;
   a second ring resonator positioned in the second path including at least two substantially fully reflective surfaces and a second partially reflective surface, the second partially reflective surface for passing a portion of the second sub-beam into the second ring resonator, while reflecting the remainder of the second sub-beam away therefrom, whereby light exiting the second ring resonator after a second resonator delay is combined with the remainder of the second sub-beam forming a second recombined sub-beam;
   a second beam splitter for receiving the first and second recombined sub-beams resulting in the interference thereof and the production of a first output beam and a second output beam;
   a first output port for outputting the first output beam; and
   a second output port for outputting the second output beam.

2. The device according to claim 1, wherein the first beam splitter comprises a first beam splitting coating applied onto one side of a substantially transparent substrate, and wherein the first beam splitting coating has a reflectance ranging from about 43% to about 50%.

3. The device according to claim 2, wherein the second beam splitter comprises a second beam splitting coating applied onto the one side of the substantially transparent substrate adjacent the first beam splitting coating, and wherein the second beam splitting coating has a reflectance ranging from about 43% to about 50%.

4. The device according to claim 3, wherein the first partially reflective coating is applied on another side of the substantially transparent substrate.

5. The device according to claim 1, wherein a first optical path length is defined by a distance from the first beam splitter to the first ring resonator and back to the second beam splitter; wherein a second optical path length is defined by a distance from the first beam splitter to the second ring resonator and back to the second beam splitter; wherein the first and second resonator delays are equal; and wherein the first optical path length is longer than the second optical path length by a distance approximately equal to one half of the first resonator delay.

6. The device according to claim 5, wherein the first partially reflective coating has a reflectance ranging from about 42% to about 50%.

7. The device according to claim 6, wherein the second partially reflective coating has a reflectance ranging from about 2.4% to about 5.2%.

8. The device according to claim 1, wherein the first ring resonator further comprises a tuning plate for adjusting the optical path length thereof.

9. The device according to claim 7, wherein the input optical beam includes a plurality of wavelength division multiplexed channels; wherein the first output beam includes a first set of the plurality of channels; and wherein the second output beam includes a second set of the plurality of channels.

10. The device according to claim 9, wherein the first set of channels includes one of more of the odd ITU channels; and wherein the second set of channels includes one or more of the even ITU channels.

11. A Mach-Zehnder interferometer comprising:
    a beam splitter for separating an input beam of light into a first sub-beam and a second sub-beam, and for directing the first and second sub-beams along first and second arms, respectively, of the interferometer;
    a first ring resonator in the first arm of the interferometer having a first resonator delay for effecting the phase response of the first sub-beam;
    a second ring resonator in the second arm of the interferometer having a second resonator delay for effecting the phase response of the second sub-beam;
    a beam combiner/splitter for interfering the first and second sub-beams resulting in first and second output beams.

12. The device according to claim 11, wherein the first ring resonator further comprises a tuning plate for adjusting the optical path length thereof.

13. The device according to claim 11, wherein the first resonator delay is substantially equal to the second resonator delay; and wherein the first arm is longer than the second arm by a distance substantially equal to half of the first resonator delay.

14. The device according to claim 13, wherein the input optical beam includes a plurality of wavelength division multiplexed channels; wherein the first output beam includes a first set of the plurality of channels; and wherein the second output beam includes a second set of the plurality of channels.

15. The device according to claim 14, wherein the first set of channels includes one of more of the odd ITU channels; and wherein the second set of channels includes one or more of the even ITU channels.

\* \* \* \* \*